(12) United States Patent
Snyder et al.

(10) Patent No.: US 11,893,413 B2
(45) Date of Patent: Feb. 6, 2024

(54) VIRTUAL CHANNEL SUPPORT USING WRITE TABLE

(71) Applicant: Apple Inc., Cupertino, CA (US)

(72) Inventors: Michael D. Snyder, Cedar Park, TX (US); Ronald P. Hall, Cedar Park, TX (US); Deepak Limaye, Austin, TX (US); Brett S. Feero, Lake Oswego, OR (US); Rohit K. Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 17/143,149

(22) Filed: Jan. 6, 2021

(65) Prior Publication Data

US 2022/0083369 A1 Mar. 17, 2022

Related U.S. Application Data

(60) Provisional application No. 63/077,491, filed on Sep. 11, 2020.

(51) Int. Cl.
*G06F 9/46* (2006.01)
*G06F 9/50* (2006.01)

(52) U.S. Cl.
CPC .......... *G06F 9/467* (2013.01); *G06F 9/5016* (2013.01); *G06F 9/5022* (2013.01)

(58) Field of Classification Search
CPC ....... G06F 9/467; G06F 9/5016; G06F 9/5022
See application file for complete search history.

(56) References Cited

U.S. PATENT DOCUMENTS

| | | | |
|---|---|---|---|
| 8,949,500 B2 | 2/2015 | Byrne et al. | |
| 9,348,775 B2 | 5/2016 | Jandhyam | |
| 9,389,906 B2 | 7/2016 | Doshi et al. | |
| 9,710,180 B1* | 7/2017 | Van Gaasbeck | G06F 3/0616 |
| 11,314,635 B1* | 4/2022 | Volpe | G06F 3/0656 |
| 2019/0155640 A1 | 5/2019 | Landers et al. | |
| 2019/0179567 A1* | 6/2019 | Kanno | G06F 3/0679 |
| 2019/0303344 A1* | 10/2019 | Kong | G06F 15/17318 |
| 2021/0026567 A1* | 1/2021 | Lim | G06F 3/0679 |

* cited by examiner

*Primary Examiner* — Tammy E Lee
(74) *Attorney, Agent, or Firm* — Kowert, Hood, Munyon, Rankin & Goetzel, P.C.; Scott W. Pape; Dean M. Munyon

(57) ABSTRACT

An embodiment of an apparatus includes a processing circuit and a system memory. The processing circuit may store a pending request in a buffer, the pending request corresponding to a transaction that includes a write request to the system memory. The processing circuit may also allocate an entry in a write table corresponding the transaction. After sending the transaction to the system memory to be processed, the pending request in the buffer may be removed in response to the allocation of the write entry.

20 Claims, 11 Drawing Sheets t0

| Pending Request Buffer 112 | | | |
|---|---|---|---|
| type 241x | location 242x | data 243x | valid 244x |
| ⋮ | | | |
| type 241h | location 242h | data 243h | valid 244h |
| type 241b | location 242b | data 243b | valid 244b |
| type 241i | location 242i | data 243i | valid 244i |
| type 241j | location 242j | data 243j | valid 244j |
| type 241m | location 242m | data 243m | valid 244m | pending request 141x

| Write Table 114 | |
|---|---|
| hash value 246a | valid 247a |
| hash value 246d | valid 247d |
| hash value 246c | valid 247c |
| hash value 246e | valid 247e |
| hash value 246f | valid 247f |
| hash value 246g | valid 247g |
| hash value 246n | valid 247n | t1 (threshold satisfied)

| Pending Request Buffer 112 | | | |
|---|---|---|---|
| type 241x | location 242x | data 243x | valid 244x |
| ⋮ | | | |
| type 241h | location 242h | data 243h | valid 244h |
| type 241b | location 242b | data 243b | valid 244b |
| type 241i | location 242i | data 243i | valid 244i |
| type 241j | location 242j | data 243j | valid 244j |
| type 241m | location 242m | data 243m | valid 244m | pending request 141x

| Write Table 114 | |
|---|---|
| hash value 246a | valid 247a |
| hash value 246d | valid 247d |
| | |
| hash value 246e | valid 247e |
| hash value 246f | valid 247f |
| hash value 246g | valid 247g |
| hash value 246n | valid 247n | t1 (threshold not satisfied)

| Pending Request Buffer 112 | | | |
|---|---|---|---|
| ⋮ | | | |
| type 241h | location 242h | data 243h | valid 244h |
| type 241b | location 242b | data 243b | valid 244b |
| type 241i | location 242i | data 243i | valid 244i |
| type 241j | location 242j | data 243j | valid 244j |
| type 241m | location 242m | data 243m | valid 244m | write entry 142x

| Write Table 114 | |
|---|---|
| hash value 246a | valid 247a |
| hash value 246d | valid 247d |
| hash value 246x | valid 247x |
| hash value 246e | valid 247e |
| hash value 246f | valid 247f |
| hash value 246g | valid 247g |
| hash value 246n | valid 247n |

*FIG. 4*

VIRTUAL CHANNEL SUPPORT USING WRITE TABLE

PRIORITY CLAIM

This application claims the benefit of U.S. Provisional Patent Application No. 63/077,491, filed on Sep. 11, 2020, and whose disclosure is incorporated herein by reference.

BACKGROUND

Technical Field

Embodiments described herein are related to the field of processors, and more particularly to the management of memory transactions in a processor.

Description of the Related Art

In computer systems, including for example, systems-on-chip (SoCs), memory transaction requests (or simply memory transactions) are utilized, by processor cores as well as other peripheral circuits (collectively referred to herein as "source circuits"), to store and retrieve data to/from one or more memory circuits. As a computer system operates, memory transactions may be performed by source circuits to retrieve data from a memory circuit to be utilized by subsequent instructions of a program. Accordingly, these subsequent instructions are dependent on the completion of the memory transactions before being performed.

In addition, a given source circuit may have a single physical interface through which memory transactions are fulfilled. In such cases, successive read or successive write transactions may be stalled until a prior read or write transaction completes. To mitigate such a bottleneck, virtual channels may be used as a technique for improving bandwidth through a limited number of physical channels. A "virtual channel," as used herein, refers to a technique in which independent physical resources are associated with a given channel (e.g. queues at various locations in the channel), allowing two or more transactions that are not dependent on each other to be queued separately and bypass each other for use of the given channel.

SUMMARY

Broadly speaking, apparatus and methods are contemplated in which an apparatus includes a communication fabric configured to route transactions between source circuits and a system memory, and a processing circuit. The processing circuit may be configured to generate a particular transaction to write data to a particular location in the system memory, and to store, into a pending request buffer, a pending request associated with the particular transaction. The processing circuit may also be configured to allocate, in a write table, a particular write entry corresponding to the particular transaction, and to send the particular transaction to the system memory using the communication fabric. In response to the allocation of the particular write entry, the processing circuit may remove the pending request from the pending request buffer.

In a further example, the processing circuit may be further configured to generate a different transaction to write data to a different location in the system memory, and to store, into the pending request buffer, a different pending request associated with the different transaction. In response to a determination that all entries in the write table have been allocated, the processing circuit may maintain the different pending request in the pending request buffer. The processing circuit may be further configured to send the different transaction to the system memory using the communication fabric. The different transaction may be sent with a tag identifying a different pending request entry that is storing the different pending request and the particular transaction may be sent with a tag identifying the particular write entry.

In one example, the processing circuit may be further configured, in response to receiving a response indicating that the particular transaction has been performed, to deallocate the particular write entry from the write table. In another example, the apparatus may also include a bridge circuit configured to relay transactions between the processing circuit and the communication fabric.

In an example, the processing circuit may include a plurality of communication channels to the bridge circuit. The bridge circuit may include a single communication channel to the communication fabric, and support for a plurality of virtual communication channels that use the single communication channel.

In an embodiment, the processing circuit may be further configured, prior to allocating the particular write entry in the write table, to maintain, in response to a determination that a given write entry in the write table is allocated to a different transaction to the particular location, the pending request in the pending request buffer. The processing circuit may also be configured to delay sending the particular transaction to the system memory.

In another embodiment, the processing circuit may be further configured to deallocate the given write entry in response to receiving an indication that the different transaction has completed. In response to the deallocation of the given write entry, the processing circuit may allocate the particular write entry to the particular transaction.

BRIEF DESCRIPTION OF THE DRAWINGS

The following detailed description makes reference to the accompanying drawings, which are now briefly described.

FIGS. 3, 4, and 5 include tables depicting contents of a pending request buffer and a write table at different points in time.

DETAILED DESCRIPTION

Virtual channels may be used to increase bandwidth of a physical interface by allowing a source circuit to queue two or more independent transactions to be transmitted on the interface as resources in the interface permit. Use of virtual channels may allow the two or more transactions to be completed out of order. For example, a first transaction may write data to a non-volatile memory circuit with a first access time, while a second transaction, issued after the first transaction, writes data to a dynamic random access memory (DRAM) circuit with a second access time that is less than the first access time. A confirmation that the second transaction has completed may, therefore, be returned to the source circuit before a confirmation that the first transaction has completed. Accordingly, a source circuit that utilizes virtual channels may utilize techniques for tracking completion of memory transactions.

Embodiments of such techniques are disclosed herein. For example, an apparatus is disclosed that includes a communication fabric that routes transactions between source circuits (including a processor circuit) and a system memory. When the processing circuit has a write transaction to dispatch, a pending request associated with the write transaction is stored into a pending request buffer. In addition, a write entry corresponding to the particular transaction is allocated in a write table. The write transaction is sent to the system memory and the pending request is removed from the pending request buffer and the processing circuit tracks completion of the write transaction using the write entry in the write table.

Figure 1:
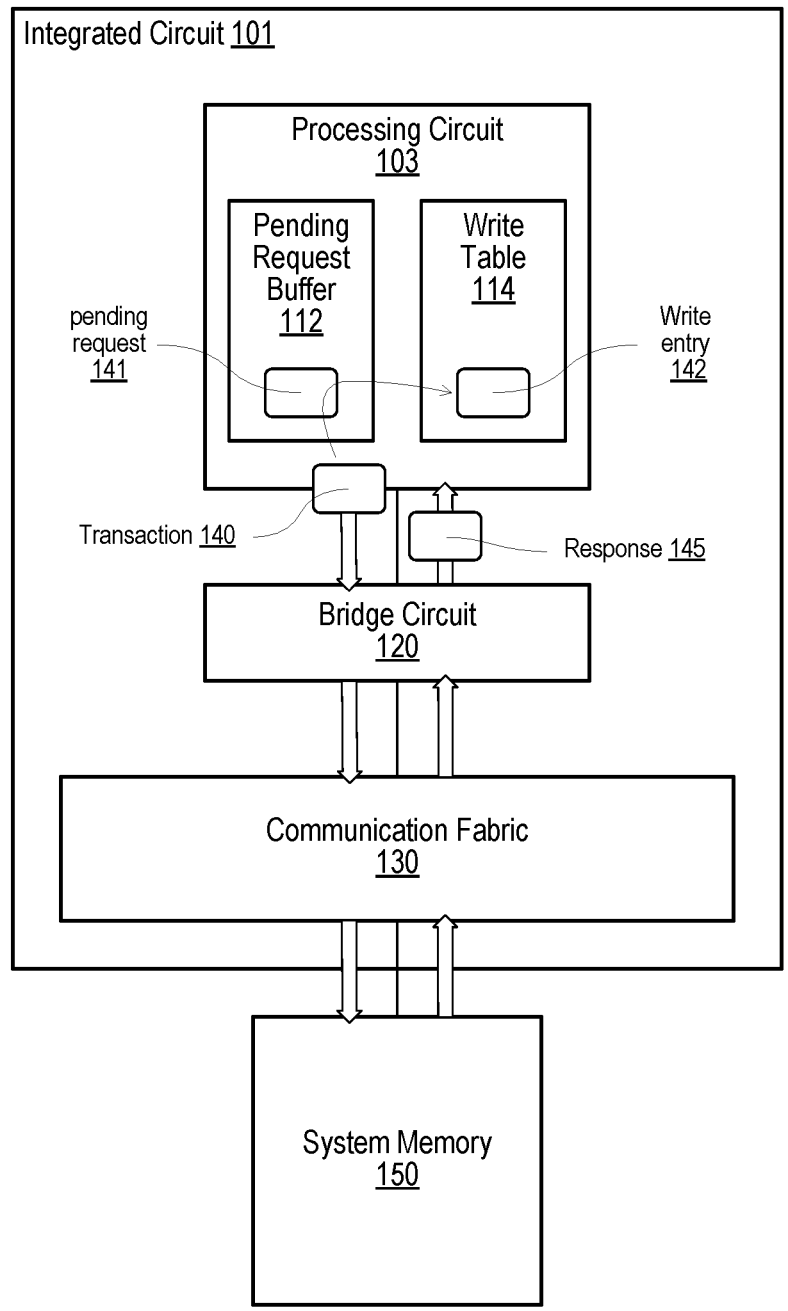
FIG. 1 illustrates a block diagram of an embodiment of a computing system including an integrated circuit and a system memory.

A block diagram for an embodiment of a computer system is illustrated in FIG. 1. As shown, computer system 100 includes integrated circuit 101 and system memory 150. Integrated circuit 101 includes processing circuit 103, bridge circuit 120, and communication fabric 130. Integrated circuit 101 is coupled to system memory 150 via communication fabric 130. Although shown as separate from integrated circuit 101, in some embodiments, system memory may be included as a part of integrated circuit 101. Computer system 100 may, in various embodiments, be a desktop or laptop computer, a tablet computer, a smart phone, a wearable device such as a smart watch, a smart home assistant, and the like.

As depicted, processing circuit 103 may be a source circuit, e.g., any suitable circuit or combination of circuits capable of generating a memory transaction. As used herein, a "memory transaction" or simply "transaction" refers to a request to read or write content (e.g., data or instructions) stored in a memory location corresponding to a particular address. In various embodiments, the address may be provided as a logical address, a virtual address, a physical address, or any other type of address. Processing circuit 103 may be a processor core, graphics processor, network processor, audio processor, camera interface circuit, display circuit, and the like. In some embodiments, processing circuit 103 may include two or more such circuits.

Communication fabric 130, as shown, is configured to route transactions between source circuits (including processing circuit 103) and destination circuits such as system memory 150. In addition to system memory 150, destination circuits may include, for example, serial and/or wireless interfaces, display devices, memory circuits, and other similar circuits. Some of these circuits may operate as both source and destination circuits. For example, a graphics processor may be a destination for image data sent by a camera circuit and then as a source circuit to send image data to system memory 150 and/or a display interface.

In some cases, a source circuit, such as processing circuit 103, may utilize a particular type of interface that is different than an interface supported by communication fabric 130. As illustrated, bridge circuit 120, includes circuitry to "bridge" from the interface of processing circuit 103 to the interface of communication fabric 130. Bridge circuit 120, therefore, receives transactions from processing circuit 103, including transaction 140, and relays the transaction to communication fabric 130 to be completed using an addressed destination circuit.

As shown, system memory 150 may be any suitable type of memory circuit. For example, system memory 150 may be a dynamic random-access memory (DRAM), a static random access memory (SRAM), a read-only memory (ROM), or a non-volatile memory such as flash memory. In some embodiments, system memory 150 may include a combination of one or more memory types.

Processing circuit 103, as illustrated, accesses system memory 150 by dispatching one or more transactions, such as transaction 140. Processing circuit 103 receives requested data from a read transaction, or a confirmation of a successful write transaction, in response 145. Although not shown, communication fabric 130 may include or utilize a memory controller circuit for exchanging transactions and responses with system memory 150.

Processing circuit 103, as shown, may issue a second transaction before a first transaction has completed via a response 145. Accordingly, processing circuit 103 utilizes a technique for tracking issued transactions until a corresponding response has been received with requested read data or an indication of a completed write request. In the illustrated embodiment, processing circuit 103 is configured to generate transaction 140 to write data to a particular location in system memory 150. Transaction 140 may include an address indicating a location in system memory 150, as well as one or more bytes of data to be stored at the indicated location. Read transactions may also be generated and include similar information, but do not include the data. The data is returned in the response 145 for reads. Read transactions are tracked in the pending request buffer 112 in this embodiment, while write transactions may be tracked in the write table 114 after issuance to the bridge circuit 120

As depicted, processing circuit 103 is also configured to store, into pending request buffer 112, pending request 141 associated with transaction 140. More particularly, processing circuit 103 is configured to store pending requests in pending request buffer 112 as the requests are provided from the processing circuit 103. The corresponding transaction 140 may be generated once the pending request is selected from pending request buffer 112 for issuance. Processing circuit 103 maintains pending request buffer 112 to queue transactions that are to be issued as well as to track transactions to completion after they have been issued. An entry in pending request buffer 112 may include several pieces of information associated with the entry, such as a type of transaction (e.g., read, write, read-modify-write, etc.), data for a write request, a destination (e.g. processor register) for a read request, a status of the transaction (e.g., pending issue, issued and waiting for response, response received, etc.), a priority indicator for the transaction, and the like. An entry in the pending request buffer may, therefore, include multiple bytes of information. The type field may also include various other attributes, including, in an embodiment, an indication of a virtual channel assigned to the request.

In addition to pending request 141, processing circuit 103 is configured to allocate, in write table 114, write entry 142 corresponding to transaction 140. Processing circuit 103 maintains write table 114 to track write transactions that have been issued on the interface to bridge circuit 120 until a response is received indicating that the write transactions have been completed. An entry in write table 114 may include less information than an entry in pending request buffer 112. For example, a write entry in write table 114 may, in some embodiments, include an address associated with the write transaction and one or more status bits. Since a corresponding entry in pending request buffer 112 may include data to be written, the data may be omitted from the write entry to reduce the size of write table entries.

Processing circuit 103 is further configured, as shown, to send transaction 140 to system memory 150 using bridge circuit 120 and communication fabric 130. If bridge circuit 120 is available, then processing circuit 103 sends transaction 140 to system memory 150 via bridge circuit 120 and communication fabric 130. Bridge circuit 120 includes one or more physical channels to communicate to communication fabric 130. If bridge circuit 120 is currently sending one or more prior transactions, then pending request 141 remains in pending request buffer 112. After the prior transactions have been sent, transaction 140 may be sent.

As illustrated, processing circuit 103 is further configured, in response to the allocation of write entry 142, to remove pending request 141 from pending request buffer 112. After transaction 140 is sent via bridge circuit 120, pending request 141 may be removed from pending request buffer 112 and completion of transaction 140 may be tracked using write entry 142 in write table 114. After transaction 140 is sent, the data included in transaction 140, as well as other information associated with transaction 140, may not be needed in processing circuit 103 to track completion. The smaller write entry 142 is instead used, allowing the larger pending request 141 to be removed from pending request buffer 112, thereby freeing an entry for a subsequent pending request.

In some embodiments, other conditions may also be satisfied before removing pending request 141. For example, pending request 141 may not be removed until there are no other operations associated with transaction 140 to be performed by pending request buffer 112. The data included in transaction 140 may be stored in pending request 141 in pending request buffer 112 until transaction 140 is sent. As such, pending request 141 is retained until all of the data is sent to system memory 150 via bridge circuit 120 and communication fabric 130. After the data is sent, the only task remaining for transaction 140 may be to track the completion of the write request, and to determine address-collisions with subsequent transactions, both of which be accomplished by write entry 142 in write table 114. Accordingly, an overlap may exist during which both pending request 141 and write entry 142 are valid, e.g., write entry 142 is allocated, but the data for transaction 140 has not completed a transfer to bridge circuit 120.

Processing circuit 103, as depicted, is further configured, in response to receiving response 145 indicating that transaction 140 has been performed, to deallocate write entry 142 from write table 114. After system memory 150 completes the write request included in transaction 140, an indication of the completion of the write, including a reference to the address associated with the write, is sent by system memory 150 in response 145. Response 145 is received by processing circuit 103. Using the indicated address, write entry 142 is identified and marked as completed. This entry in write table 114 may now be used for a subsequent write request.

By utilizing write table 114 to track write transactions issued by processing circuit 103, a plurality of write transactions may be tracked using less memory and/or register circuitry than a corresponding number of entries in pending request buffer 112. By reducing an amount of circuitry used for each entry, processing circuit 103 may be designed to fit within a smaller amount of die area than if pending request buffer 112 were used to track a same number of write transactions. In addition, a reduced amount of circuitry may reduce an amount of power consumed, as well as an amount of heat generated, thereby prolonging a battery life in a portable computer system and improving thermal management of the computer system.

It is noted that computer system 100, as illustrated in FIG. 1, is merely an example. The illustration of FIG. 1 has been simplified to highlight features relevant to this disclosure. Various embodiments may include different configurations of the circuit blocks, including additional circuit blocks, such as, for example, additional processing circuits and/or memory circuits. In some embodiments, a memory controller circuit may be included between system memory 150 and communication fabric 130.

FIG. 1 includes an integrated circuit with processing circuit that maintains a pending request buffer and a write table, as well as a bridge circuit used to communicate to a communication fabric. Integrated circuits may be implemented in a variety of fashions with a variety of features. One embodiment of an integrated circuit is illustrated in FIG. 2.

Figure 2:
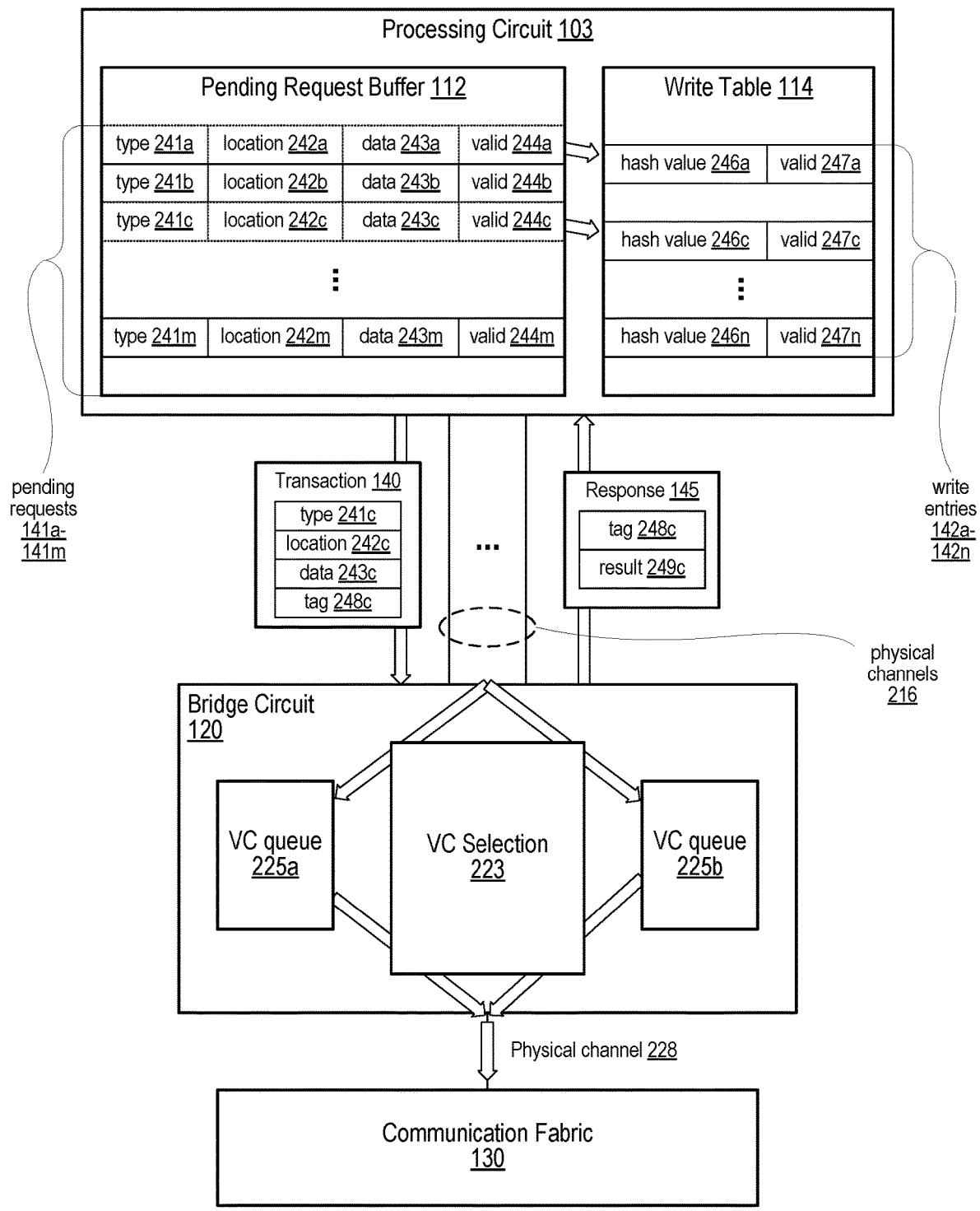
FIG. 2 shows a block diagram of an embodiment of an integrated circuit included in the embodiment of FIG. 1.

Moving to FIG. 2, a block diagram representing an embodiment of integrated circuit is shown. As disclosed above, integrated circuit 101 includes processing circuit 103, bridge circuit 120 and communication fabric 130. As shown in FIG. 2, processing circuit 103 maintains, in pending request buffer 112, entries that include four illustrated pieces of information and, in write table 114, entries that include two pieces of information. Bridge circuit 120 includes support for virtual channels to communicate with communication fabric 130 via physical channel 228. This support includes circuitry for virtual channel (VC) selection 223 and virtual channel (VC) queues 225a and 225b.

As shown, processing circuit 103 utilizes a plurality of physical channels 216 to communicate with bridge circuit 120. Bridge circuit 120, in turn, includes a single physical channel 228 to communication fabric 130. To increase bandwidth for issuing transactions, bridge circuit 120, as shown, includes support for a plurality of virtual communication channels that use physical channel 228. This support includes VC queues 225a and 225b, as well as VC selection 223 for allocating transactions between the two VC queues. Utilizing virtual channels may allow processing circuit 103 to issue more than one transaction concurrently, via physical channels 216. Each virtual channel is supported by a respective one of VC queues 225a and 225b. VC queues 225a and 225b may each include one or more entries for holding transaction details until physical channel 228 is available for sending a next transaction. The virtual channels may also permit different levels of priority to be assigned to transactions, and may allow higher priority transactions to bypass lower priority transactions. Separating the transactions into VC queues 225a and 225b allows the higher priority VC to bypass the lower priority VC. There may be more virtual channels in other embodiments.

It is noted that, as used herein, "concurrent" refers to events or actions that overlap in time. It is not intended to imply that such events or actions must begin and/or end simultaneously, although simultaneous occurrences are not excluded. For example, first and second transactions may be issued concurrently when the second transaction is issued before the first, previously-issued, transaction completes.

VC selection 223, as illustrated, includes circuitry configured to allocate transactions issued by processing circuit 103 to be sent via VC queue 225a or 225b. VC selection 223 may further be configured to arbitrate between VC queues 225a and 225b when physical channel 228 becomes available for receiving a next transaction. Any suitable arbitration method may be used for the selection, for example, selecting the least recently used queue, selecting the queue with a higher priority transaction, or a combination thereof. In an embodiment, bridge circuit 120 may be allocated credits for each VC, controlling the number of transactions outstanding for a given VC. Bridge circuit 120 may consume credits when transactions are issued, and may be provided more credits when transactions complete. If there are no credits available for a given VC, bridge circuit 120 may not transmit a transaction from the given VC on communication fabric 130 until additional credits are provided for the given VC. However, transactions from another VC may be transmitted if credits are available for the other VC.

Processing circuit 103 may generate a transaction to be sent via bridge circuit 120. Before such a transaction is sent, information associated with the transaction is stored in pending request buffer 112. As shown, pending request buffer 112 includes a plurality of entries, pending requests 141a-141m (collectively, pending requests 141). A given one of pending requests 141 includes a type of instruction 241, a location 242, data 243, and a valid status 244. Type 241 indicates if the transaction is a read request, a write request, a combination (e.g., a read-modify-write request), or other type of operation. Location 242 indicates, for example, an address of a memory and/or a register to access. Such an address may correspond to a global memory map for computer system 100, or may include a plurality of indicators, such as a bus address of a device to receive the transaction as well as an indicator of a memory or register within the indicated device. Data 243 includes data to be written to the indicated location if the transaction is a write request. Otherwise, data 243 may correspond to a location for storing returned data if the transaction is a read request. Valid 244 corresponds to a status indicator for the corresponding one of pending requests 141. In some embodiments, the status may be valid (the transaction is still pending completion) or invalid (the transaction has been completed and this entry is available for storing a new transaction). In other embodiments, valid 244 may indicate one of a variety of status conditions, such as "valid but not sent," "valid and sent," "invalid and available," "invalid with error," and the like. It is contemplated that other pieces of information may be included in pending requests 141, such as a priority of the corresponding transaction, an identifier of a program process or thread associated with the transaction, and other such information.

When a particular pending request 141 is selected for transmission on the interface to the bridge circuit 120, processing circuit 103 is configured to determine if the particular pending request 141 includes a write request. If so, then a particular value is stored into a particular one of write entries 142a-142n (collectively write entries 142) in write table 114 if the particular entry is available to be allocated. To store the particular value in the particular one of write entries 142, processing circuit 103 is further configured to generate a particular value using a hash of the particular location 242. For example, in response to determining that pending request 141c includes a write request, processing circuit 103 generates hash value 246c using a value of location 242c. Hash value 246c is then stored into write entry 142c along with a corresponding valid indicator 247c.

In some embodiments, processing circuit 103 determines if a valid entry in write table 114 includes a corresponding hash value that matches hash value 246c. For example, in some embodiments, write table 114 may be implemented, at least in part, as a content-addressable memory (CAM). Processing circuit 103 may then use hash value 246c as an input into the CAM to determine if a matching hash value to the hash value 246c is found. If no matching hash value is detected, then processing circuit 103 may proceed to allocate write entry 142c to transaction 140. Otherwise, processing circuit 103 may wait until a matching valid write entry is deallocated before allocating write entry 142c to transaction 140 and before issuing the transaction 140. In this manner, writes to the same address may be performed in their original order. Similarly, a pending request may not be issued if the address of the request matches earlier requests in pending request buffer 112. In one implementation, the address of a request may be compared to addresses of pending request in the pending request buffer 112 and to hash values in the write table 114 upon entry of the request into the pending request buffer. A dependency vector may be generated and the request may not be eligible to issue the corresponding transaction 140 until the requests indicated in the dependency vector have completed.

Hash value 246c may be generated by applying any suitable hashing function to all, or a portion, of a value of location 242c. In some embodiments, hash value 246c may include fewer bits than the value of location 242c. For example, location 242c may include a 64-bit address value. To generate hash value 246c, processing circuit 103 may take all 64 bits of the address value in location 242c, or may take a portion, such as the least significant 32 bits, the middle 48 bits, the most significant 24 bits, or any other suitable portion. The hashing algorithm may simply include an exclusive-OR of half of the taken bits with the remaining half of the taken bits to generate a hash value 246d with half as many bits as were taken. In other embodiments, processing circuit 103 may utilize a more complex hashing algorithm, such as a Secure Hash Algorithm, version 3 (SHA-3). By using a hash value that is smaller than the address value, write entries in write table 114 may be reduced in size, thereby saving die area as well as potentially saving power. Since more than one address may correspond to a given hash value, it is possible that a subsequent transaction having a different address but the same hash value will be detected to match the given hash value. Correct operation may be observed, even though some transactions that could have proceeded to issue do not issue because of the matching has values. However, the reduced storage in write table 114 may allow for more entries in the write table 114 to be implemented in a given area, which allows for improved performance. In other embodiments, hashing may not be used and the location field 242c may be copied to the write table 114 for address matching purposes.

Processing circuit 103, as shown, is configured to send transaction 140, corresponding to pending request 141c, to bridge circuit 120 via one of physical channels 216. In various embodiments, processing circuit 103 may send transaction 140 before the corresponding write entry 142c has been stored, while write entry 142c is being stored, or after write entry 142c has been stored. Transaction 140 includes various pieces of information, including type 241c, location 242c, data 243c, and a tag 248c. A given tag 248 includes an identifier for an entry in either pending request buffer 112 or in write table 114. Since transaction 140 includes a write request and therefore has a corresponding write entry 142c, tag 248c identifies the particular location in write table 114 where write entry 142c is stored. As shown, this identifier indicates a particular location. In other embodiments, pending requests 141 and write entries 142 may also include a corresponding tag 248. If a given transaction does not include a write request, or if a write request is issued when there is no entry available in the write table 114, then the corresponding tag 248 would indicate a particular entry in pending request buffer 112 allocated to the given transaction.

Processing circuit 103, in response to sending transaction 140, deallocates pending request 141c since this transaction will be tracked using write entry 142c. Deallocation may include, for example, setting valid indicator 244c to a value indicating that pending request 141c is invalid and available for use with a different transaction.

Bridge circuit 120 receives transaction 140 and allocates transaction 140 to either VC queue 225a or 225b. The VC may be indicated in the transaction, e.g. as part of the type field or other data transmitted with the transaction 140. When transaction 140 reaches a head of the allocated queue, there are credits available for the VC, and physical channel 228 is available, bridge circuit 120 sends transaction 140 to communication fabric 130 via physical channel 228. In some embodiments, tag 248c is sent with transaction 140, while in other embodiments, tag 248c is removed and instead is stored and tracked within bridge circuit 120.

After transaction 140 has been performed by the destination circuit, response 145 is sent from bridge circuit 120 to processing circuit 103. Response 145 includes tag 248c as well as a result 249c. Since type 241c included a write request, result 249c includes a status indicating if the write operation was successful or not. For example, if there was an error in the data introduced during transmission or writing of the data to the storage location, and error may result and error handling may be instituted. In other embodiments, the result 249c may simply indicate that the write is complete. Assuming result 249c indicates success, then valid indicator 247c in write entry 142c may be set to a value indicating that the associated transaction has completed and write entry 142c can be overwritten with information for a different transaction.

In some embodiments, write table 114 is used for write transactions to one or more particular memory circuits, such as system memory 150. For example, processing circuit 103 may allocate a different pending request entry (pending request 141b) in pending request buffer 112, wherein pending request 141b is associated with a different transaction to write data to location 242b. In response to determining that location 242b corresponds to a particular circuit other than system memory 150, processing circuit 103 maintains pending request 141b in pending request buffer 112 rather than storing a corresponding write entry 142b in write table 114. Processing circuit 103 sends the different transaction to be queued in one of VC queues 225 in bridge circuit 120 to be sent to the particular circuit. The different transaction is sent with a tag 248b (not shown) identifying pending request 141b, rather than a tag that identifies an entry in write table 114.

It is noted that the integrated circuit of FIG. 2 is an example for demonstrating the disclosed concepts. FIG. 2 has been simplified for clarity. Other embodiments may include different or additional circuit blocks. For example, some embodiments may include one or more destination circuits and/or other source circuits coupled to communication fabric 130. Although bridge circuit 120 is shown with two virtual channels, in other embodiments, bridge circuit 120 may support any suitable number of virtual channels.

FIG. 2 includes hash values as part of the write table entries. These hash values may be utilized when new pending requests are allocated. One example of a use of the hash values is depicted in FIG. 3.

Figure 3:
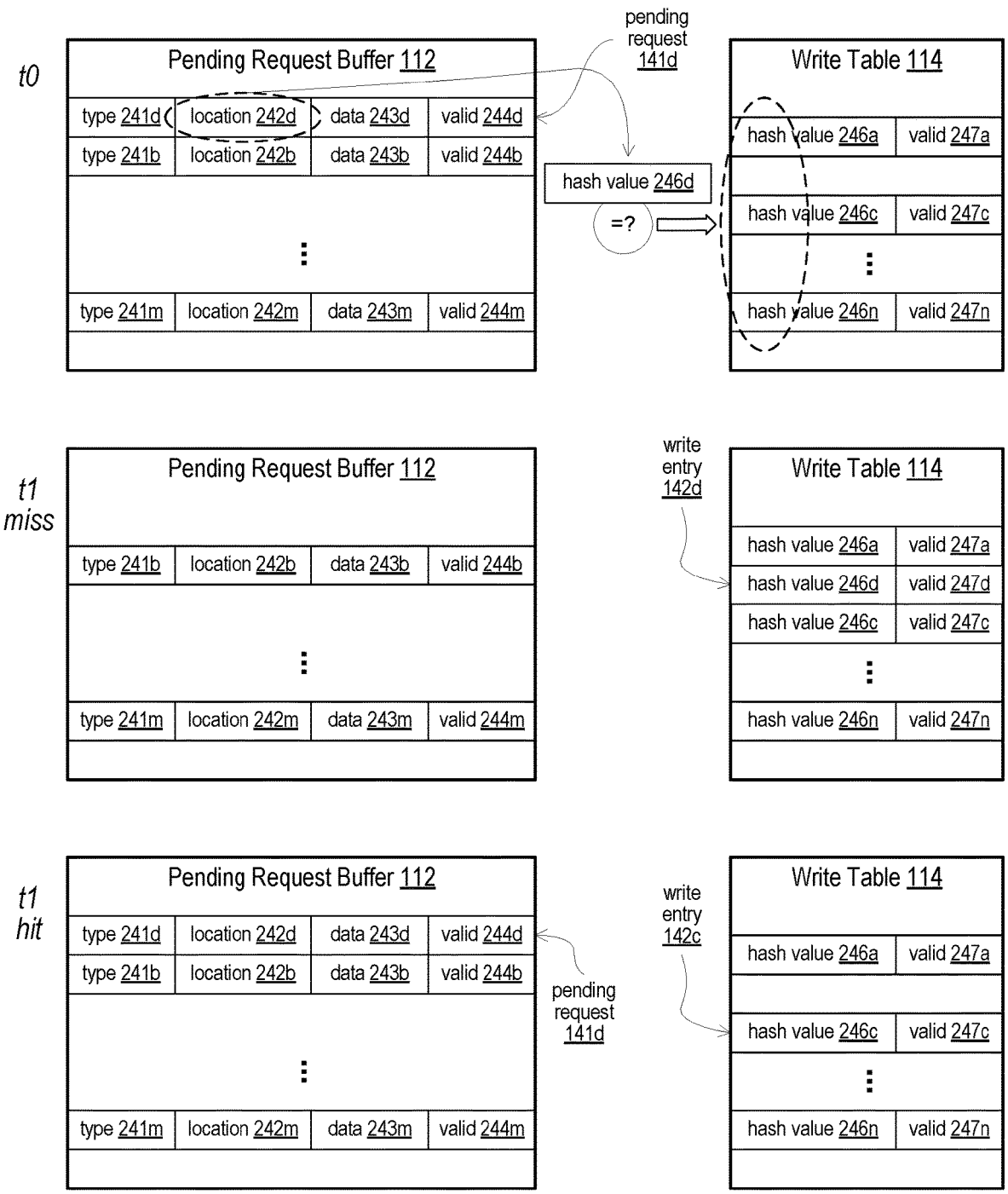

Turning to FIG. 3, embodiments of pending request buffer 112 and write table 114 are depicted for a plurality of points in time. FIG. 3 illustrates how a hash value may be utilized after a particular transaction is added to pending request buffer 112 at a time t0, and how, based on a generated hash value, a write entry may or may not be stored in write table 114 at time t1.

Referring to FIG. 2 as well as the tables of FIG. 3, processing circuit 103 allocates pending request 141d, associated with the particular transaction, in pending request buffer 112. In response to determining that pending request 141d includes a write request and that the write request is ready to be issued on to bridge circuit 120, processing circuit 103 is configured to generate hash value 246d using location 242d. Hash value 246d is compared to one or more hash values stored in write table 114, including hash values 246a, 246c, and 246n, to determine if any stored hash value matches hash value 246d. The location 242d is also compared to other locations in the pending request buffer 112 corresponding to preceding request to determine if there are any location dependencies in the pending request buffer 112. If the hash value matches in the write table 114 or the location matches a preceding request, the write request may not yet be performed.

At time t1, in response to determining that hash value 246d is not currently stored in the write table (e.g., a write table "miss"), processing circuit 103 selects an available write entry (write entry 142d) to allocate to the particular transaction. If no stored hash values match hash value 246d, then it is safe to assume that processing circuit 103 does not have any pending writes to a same location as location 242d. Accordingly, the particular transaction may be tracked using write entry 142d, and once the particular transaction is sent to bridge circuit 120, pending request 141d may be deallocated from pending request buffer 112. Deallocating pending request 141d frees the corresponding entry in pending request buffer 112 for a different transaction while processing circuit 103 may still track completion of the particular transaction using the smaller write entry 142d.

If instead, at time t1, processing circuit 103 determines that one of the stored hash values (e.g., hash value 246c) has a same value as hash value 246d, then write entry 142d is not stored. As shown, processing circuit 103 is further configured to, prior to allocating write entry 142d in write table 114 and in response to a determination that write entry 142c in write table 114 is allocated to a different transaction to the same location, maintain pending request 141d in pending request buffer 112, and delay sending the particular transaction to a memory circuit. The determination that hash value 246c matches hash value 246d provides an indication that location 242c is the same as location 242d. Processing circuit 103, to avoid having multiple write requests to a same location, delays sending the particular transaction. The particular transaction is delayed by maintaining pending request 141d in pending request buffer 112, where it remains until write entry 142c is deallocated.

At another time, after time t1, processing circuit 103 is further configured to deallocate write entry 142c in response to receiving an indication that the different transaction has completed. In response to the deallocation of write entry 142c, processing circuit 103 is further configured to allocate write entry 142d to the particular transaction and store the entry in write table 114. Processing circuit 103 may send the particular transaction to the memory circuit and then deallocate pending request 141d from pending request buffer 112.

It is noted that the embodiment of FIG. 3 is merely an example. In other embodiments, the pending requests and write entries may include different pieces of information that what is shown. Although pending request buffer 112 and write table 114 are shown as separate elements, in some embodiments they may be included in a same memory circuit or same register file in processing circuit 103, or in a different circuit that is accessible by processing circuit 103.

Figure 5:
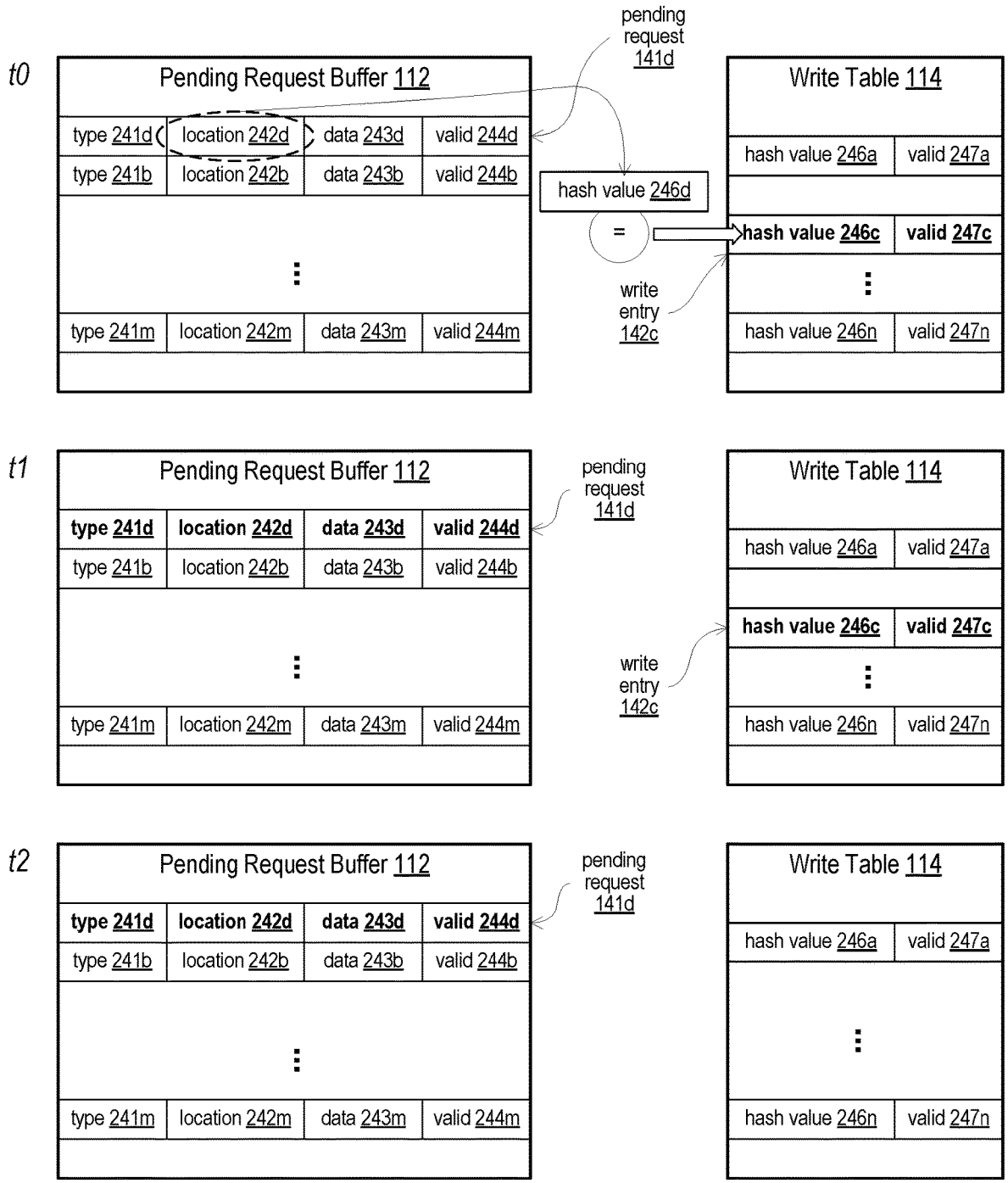

FIG. 3 illustrates an example of allocation of pending requests and write entries in accordance with the disclosed concepts. Additional examples of how a processing circuit may manage pending requests and write entries are depicted in FIGS. 4 and 5.

Proceeding to FIG. 4, embodiments of pending request buffer 112 and write table 114 are again depicted for a plurality of points in time. FIG. 4 illustrates actions performed by processing circuit 103 in response to write table 114 not having any available entries. In a similar manner as FIG. 3, FIG. 4 illustrates two potential actions taken based on a threshold number of pending requests being allocated.

Referring to the integrated circuit of FIG. 2, processing circuit 103, at time t0, allocates, for a particular transaction including a write to location 242x in system memory 150, pending request 141x in pending request buffer 112. As illustrated, processing circuit 103 is configured to maintain, in response to a determination that all entries in write table 114 have been allocated, pending request 141x in pending request buffer 112. Processing circuit 103 is further configured to determine if pending request buffer 112 has a threshold number of entries available for new pending requests.

At time t1, in response to a determination that pending request buffer 112 has a threshold number of available entries, processing circuit 103 is further configured to send the particular transaction to system memory 150 using communication fabric 130. The particular transaction is tracked using pending request 141x. The particular transaction is, therefore, sent with a tag identifying pending request 141x since there is no entry in write table 114 to identify. In the threshold satisfied case, an entry in write table 114, once available, is not allocated to the particular transaction At time t1, in response to a determination that pending request buffer 112 does not have a threshold number of available entries, processing circuit 103 is further configured to delay placement of the particular transaction in bridge circuit 120. Pending request 141x remains in pending request buffer 112, without being sent, until an entry in write table 114 becomes available. In response to a determination that a given write entry in write table 114 has been deallocated, processing circuit 103 stores, in the given write entry (e.g., write entry 142x), hash value 246x associated with location 242x. The particular transaction is queued in bridge circuit 120, and in response to a determination that hash value 246x has been stored in write entry 142x, processing circuit 103 deallocates pending request 141x from pending request buffer 112. In this case, the particular transaction is queued with a tag identifying write entry 142x.

Without considering the threshold number of entries available in pending request buffer 112, a condition may occur in which pending request buffer 112 becomes full with pending write requests that have been sent while entries in write table 114 are deallocated as their associated transactions are completed. For example, in response to having a series of transactions that include write requests, write table 114 may reach a full state. Additional transactions with write transaction may continue to be generated before any previously sent transactions have completed, causing pending request buffer 112 to become filled with these overflow transactions, which are then sent via bridge circuit 120 and tracked using the pending request entries. If pending request buffer 112 fills with write requests before entries in write table 114 are deallocated, then new requests cannot be received by pending request buffer 112 until the current requests are deallocated in response to the transactions completing. Since the write requests that are tracked in write table 114 were received before the write request that are tracked with the entries in pending request buffer 112, entries in write table 114 may frequently be deallocated before the entries in pending request buffer 112 (although out-of-order completion is possible). Since pending request buffer 112 is filled with entries that have been sent and are being tracked via pending request buffer 112, these pending request entries cannot be converted to write entries in write table 114. Pending request buffer 112 remains stalled until one or more pending request are deallocated, at which time new write requests can be allocated to write table 114.

By determining if a threshold number of entries in pending request buffer 112 are available, one or more pending write requests may be maintained without sending, such that as entries in write table 114 are deallocated, the unsent write requests can be moved from pending request buffer 112 to write table 114, thereby avoiding the condition in which multiple entries in write table 114 are available while entries in pending request buffer 112 are full.

Moving now to FIG. 5, additional embodiments of pending request buffer 112 and write table 114 are depicted for a plurality of points in time. FIG. 5 illustrates actions performed by processing circuit 103 in response to a hash value of a particular pending request matching a hash value of an entry in write table 114. In the example of FIG. 5, pending request 141d is allocated for a particular transaction that includes a write to a device other than system memory 150 in FIG. 1.

At time t0, processing circuit 103 generates hash value 246d based on a value of location 242d. Hash value 246d is compared to hash values in write table 114, and a match is determined with hash value 246c. No entry in write table 114 is allocated for the particular transaction. At time t1, in response to determining that location 242d corresponds to a particular circuit that is not supported by write table 114, processing circuit 103 sends the particular transaction to the particular circuit, including a tag that corresponds to pending request 141d. At time t2, write entry 142c is deallocated in response to an indication that a corresponding transaction has completed. Despite the deallocation of write entry 142c and the elimination of hash value 246c from write table 114, The particular transaction remains allocated to pending request 141d and is tracked via pending request buffer 112.

It is noted that the embodiments of FIGS. 4 and 5 are examples for demonstrating disclosed concepts. Additional or different pieces of information may be included in the pending requests and write entries in other embodiments. Pending request buffer 112 and write table 114 may be implemented using any suitable memory or register designs, including for example, content-addressable memory (CAM).

A bridge circuit between a processing circuit and a communication fabric is disclosed in FIG. 2 that includes support for virtual channels. An interface between a processing circuit and a communication fabric may be implemented in various fashions. Accordingly, the bridge circuit may be implemented using various designs in accordance with a particular interface. Two such implementations of a bridge circuit are shown in FIG. 6.

Figure 6:
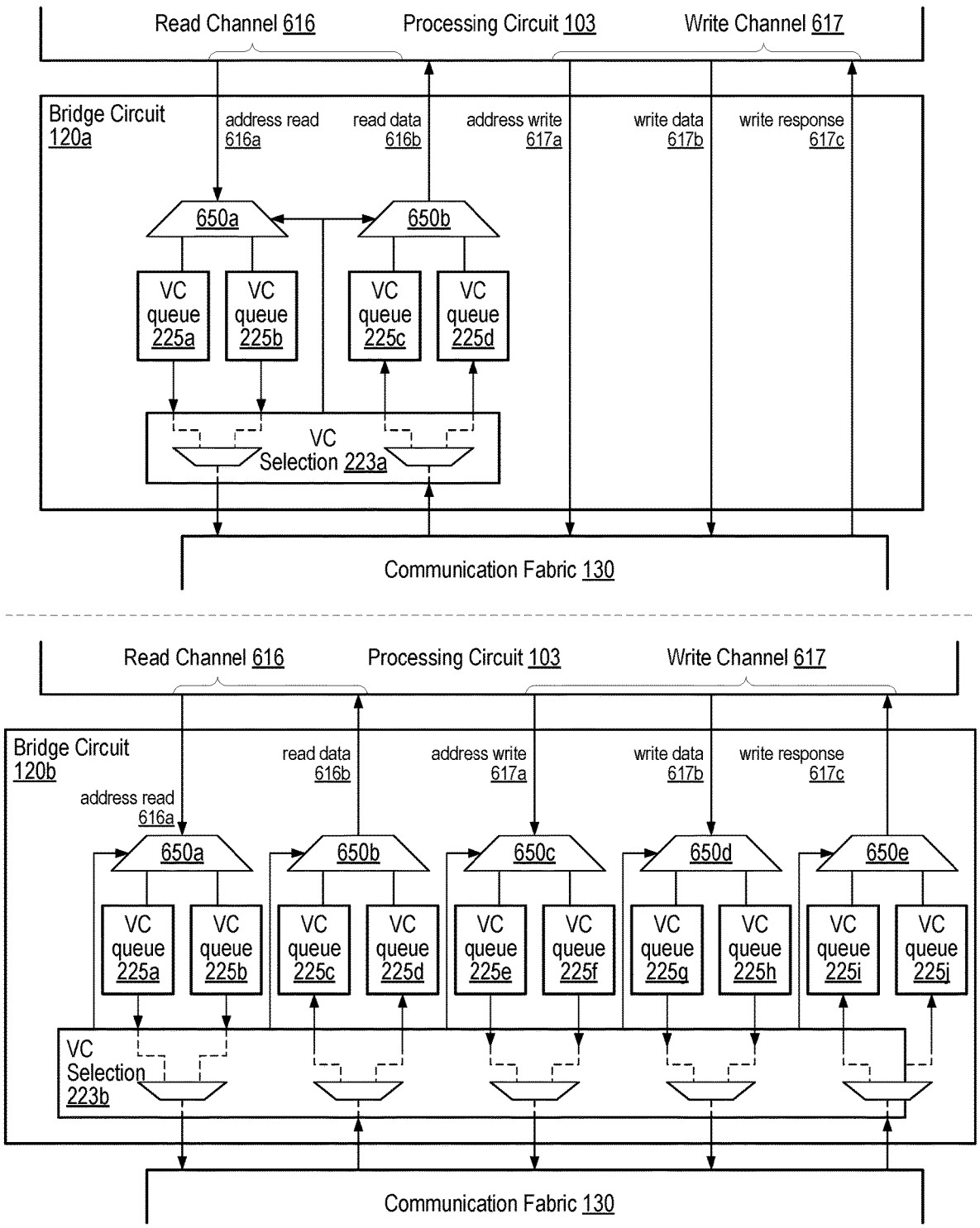
FIG. 6 shows block diagrams of two embodiments of a bridge circuit.

Proceeding to FIG. 6, two embodiments of bridge circuit 120 of FIGS. 1 and 2 are shown. Both bridge circuits 120 include two channels, one read channel and one write channel. Read channel 616 includes address read 616*a* and read data 616*b*. Address read 616*a* may include a plurality of wires for sending, by processing circuit 103, an address (e.g., a given location 242) to be read. Read data 616*b* may include a plurality of wires for receiving, by processing circuit 103, the requested data. Write channel 617 includes address write 617*a*, write data 617*b*, and write response 617*c*. Address write 617*a*, as shown, includes a plurality of wires for sending an address for storing data. Write data 617*b* may include a plurality of wires for sending, by processing circuit 103, the data to be stored. Write response 617*c* may include one or more wires for receiving an indication of a completion of a given write transaction. Bridge circuit 120*a* includes support for virtual channels on read channel 616 only, while bridge circuit 120*b* includes virtual channel support for both read channel 616 and write channel 617.

As shown, the two virtual channels included in read channel 616 may allow for support of two types of read transactions, for example, one VC for low-latency read transactions and one for bulk read transactions. A "low-latency" transaction (or LLT), as used herein, refers to a transaction with a higher priority than a "bulk" transaction. LLTs may be used when a delay in receiving the requested data may reduce performance of processing circuit 103 or other situations in which reducing a time to receiving requested data is desirable. In contrast, bulk transactions may be used for standard read requests in which delays are not as critical for performance. Bulk transactions may be used in a series of read transactions, for example, to transfer a file. An LLT may be used, for example, to read a status register or other data in response to an exception encountered by processing circuit 103.

VC selection 223*a*, as shown, controls, via multiplexors 650*a* and 650*b*, which set of VC queues are coupled to read channel 616 for a given transaction. For example, VC queues 225*a* and 225*c* may be associated with LLTs while VC queues 225*b* and 225*d* are associated with bulk transactions. If bulk transactions are more common than LLTs, then VC queues 225*b* and 225*d* may become full more frequently then VC queues 225*a* and 225*c*. In addition, write channel 617, in bridge circuit 120*a*, does not include support for VCs, and therefore may not support LLTs for write transactions. Accordingly, a particular read LLT sent via VC queues 225*a* and 225*c* may be sent out to communication fabric 130 before read and write bulk transactions that were issued by processing circuit 103 prior to the particular read LLT. If the particular read LLT is dependent on a particular write bulk transaction, then issuing of the particular read LLT may be paused until the particular write bulk transaction has completed.

Bridge circuit 120*b* includes VC support for both read channel 616 and write channel 617. Accordingly, LLTs and bulk transactions may be supported for both read and write transactions. Although write LLTs are supported by bridge circuit 120*b*, a particular read LLT may still be dependent on a particular write LLT, resulting in the read LLT being paused until the particular write LLT has completed.

As described, use of LLTs may result in transactions being completed out of order, thereby creating a desire to track completion of write transactions so dependent transactions can then be issued. By using the disclosed techniques, write tables may be used for tracking the write transactions to completion, and dependent transactions can be issued accordingly. Circuits used for entries in the write table may be reduced in size in comparison to circuits used for entries in the pending request buffer. The write transactions can be deallocated from the larger entries of the pending request buffer and tracked in the write table, freeing entries in pending request buffer for new transactions.

It is noted that the example bridge circuits of FIG. 6 are merely examples. Although one read and one write channel are shown, any suitable number of channels may be included in other embodiments. Address and data are shown with separate sets of wires. In other embodiments, some or all or the address and data signals may be multiplexed on the same wires.

The circuits of FIGS. 1 and 2 may perform the disclosed actions using any suitable technique. Three methods are described below that may be utilized by the disclosed circuits.

Figure 7:
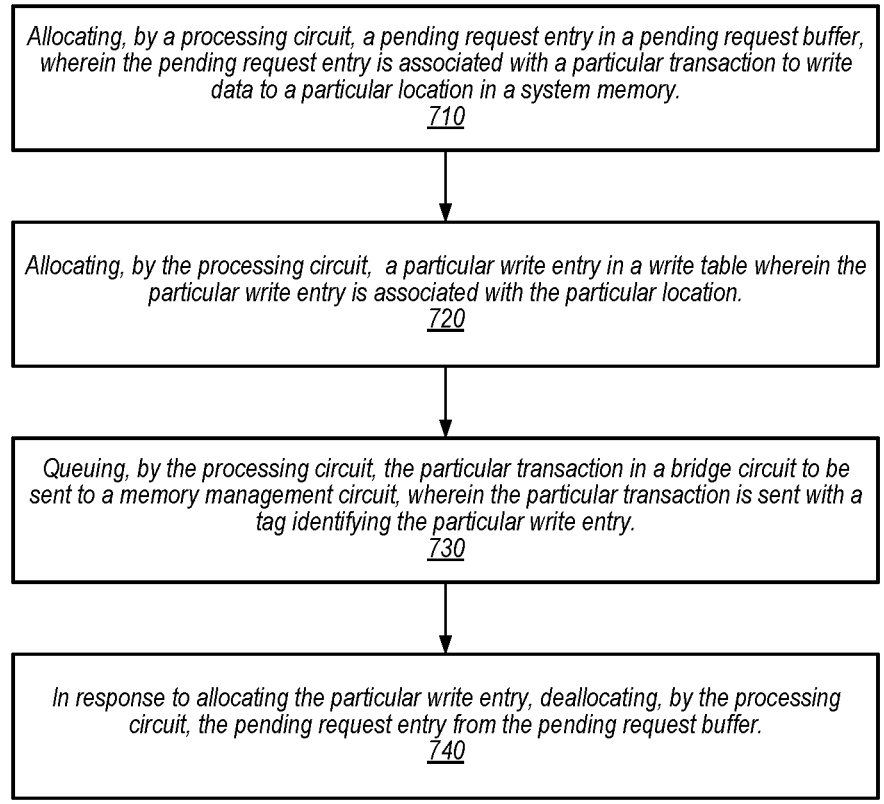
FIG. 7 shows a flow diagram of a first embodiment of a method for operating a write table by a processing circuit.

Turning now to FIG. 7, a flow diagram illustrating an embodiment of a method for operating a write table is shown. Method 700 may be applied to a computer system, such as, for example, integrated circuit 101 in FIGS. 1 and 2. For example, processing circuit 103 may include, or have access to, computer-readable non-transitory memory that includes instructions that, when executed by processing circuit 103, cause the operations of method 700 to be performed. Referring collectively to integrated circuit 101 in FIGS. 1 and 2, and to the flow diagram of FIG. 7, the method may begin in block 710.

At block 710, method 700 includes allocating, by processing circuit 103, pending request 141*c* in pending request buffer 112. As shown, pending request 141*c* is associated with a particular transaction 140 to write data to location 242*c* in system memory 150. Transaction 140 may be received by processing circuit 103 from a different circuit in integrated circuit 101, or may be generated by processing circuit 103. Transaction 140 may include one or more write requests for system memory 150. In some cases, transaction 140 may include a read-modify-write request for a location in system memory 150.

Method 700, at block 720, also includes allocating, by processing circuit 103, write entry 142*c* in write table 114, wherein write entry 142*c* is associated with location 242*c*. As shown, allocating write entry 142*c* includes generating hash value 246*c* using location 242*c*. Processing circuit 103 compares hash value 246*c* to one or more values stored in write table 114, such as hash values 246*a* and 246*n*. In response to determining that hash value 246*c* is not currently stored in write table 114, an available write entry (e.g., write entry 142*c*) is selected to allocate to transaction 140. Otherwise, in response to determining that an existing write entry includes hash value 246*c*, pending request 141*c* is maintained in pending request buffer 112. Processing circuit 103 delays the queuing of transaction 140 in bridge circuit 120 until the existing write entry is deallocated in response to an associated transaction completing.

At block 730, method 700 further includes queuing, by processing circuit 103, transaction 140 in bridge circuit 120 to be sent to system memory 150. As illustrated, processing circuit 103 sends, via one of physical channels 216, transaction 140 to bridge circuit 120. A tag 248 is included with transaction to identify write entry 142*c* that is being used to track a completion of transaction 140. VC selection 223 in bridge circuit 120 may allocate transaction 140 to one of VC queues 225*a* or 225*b*. After reaching a head of the allocated VC queue 225, transaction 140 is sent, via physical channel 228 and communication fabric 130, to system memory 150 to be fulfilled.

Method 700, in response to allocating write entry 142c, further includes at block 740, deallocating, by processing circuit 103, pending request 141c from pending request buffer 112. As shown, pending request 141c is deallocated from pending request buffer 112 after being sent and in response to determining that write entry 142c has been allocated to transaction 140. After transaction 140 has been completed in system memory 150, response 145 is generated and sent to processing circuit 103. Response 145 may be generated by system memory 150, by a memory controller included between system memory 150 and communication fabric 130, by communication fabric 130, or a combination thereof. Method 700 may end in block 740, or may return to block 710 in response to a new transaction to process.

It is noted that the method illustrated in FIG. 7 is an example for demonstrating the disclosed concepts. Although the operations of method 700 are shown as occurring in a serial order, the operations may, in other embodiments, occur in another order. In some embodiments, operations may occur concurrently. For example, the order of operations described in blocks 720 and 730 may be swapped and/or overlap one another.

Figure 8:
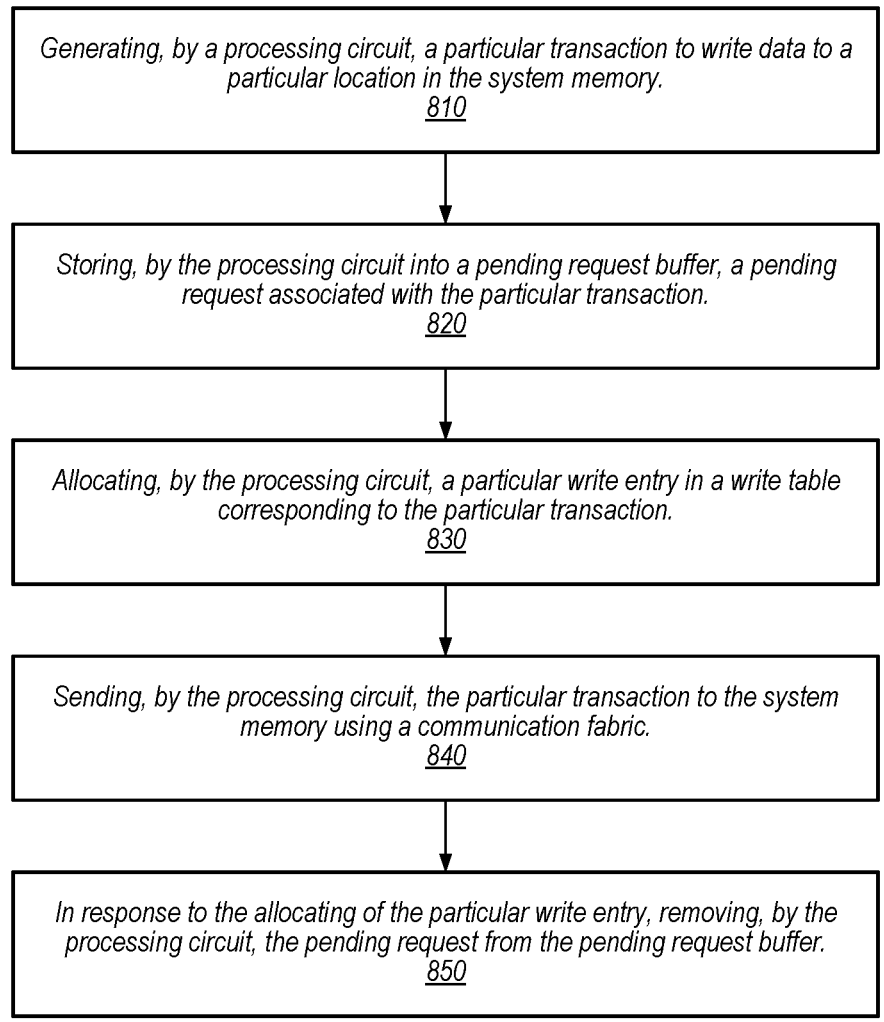
FIG. 8 presents a flow diagram of a second embodiment of a method for operating a write table by a processing circuit.

Proceeding now to FIG. 8, another flow diagram illustrating an embodiment of a method for operating a write table is shown. In a similar manner as method 700, method 800 may be applied to a computer system, such as integrated circuit 101 in FIGS. 1 and 2. Integrated circuit 101 may include, or have access to, computer-readable non-transitory memory that includes instructions that, when executed by processing circuit 103, cause the operations of method 800 to be performed. Referring collectively to integrated circuit 101 in FIGS. 1 and 2, and to the flow diagram of FIG. 8, the method may begin in block 810.

Method 800 includes, at block 810, generating, by processing circuit 103, transaction 140 to write data to location 242c in system memory 150. As shown, transaction 140 includes at least one request to write data to location 242c in system memory 150 of FIG. 1. In various embodiments, transaction 140 may be generated by processing circuit 103, or may be received by processing circuit 103 from a different circuit in integrated circuit 101. Transaction 140 may include one or more write requests for system memory 150. In some cases, transaction 140 may include one or more read requests as well as the at least one write request.

At block 820, method 800 also includes storing, by processing circuit 103 into pending request buffer 112, pending request 141c associated with transaction 140. After transaction 140 has been received or generated by processing circuit 103, processing circuit 103 stores pending request 141c in pending request buffer 112. As illustrated, several pieces of information are included in pending request 141c, including a request type 241c, location 242c, data 243c to be written, and valid indicator 244c. In some embodiments, transaction 140 may remain in pending request buffer 112 until it is sent from processing circuit 103.

Method 800 further includes, at block 830, allocating in write table 114, write entry 142c corresponding to transaction 140. In response to determining that transaction 140 includes at least one write request, write entry 142c is allocated, for transaction 140, in write table 114. Prior to allocating write entry 142c, processing circuit 103 may as illustrated, generate hash value 246c using a value of location 242c. Processing circuit 103 may then compare hash value 246c to hash values of other valid entries in write table 114. After determining that there are no matches, processing circuit 103 may then allocate write entry 142c as described.

In response to a determination that a given write entry 142 in write table 114 is allocated to a different transaction to location 242c, processing circuit 103 may be further configured to maintain pending request 141c in pending request buffer 112. Processing circuit 103 may then delay sending the particular transaction to system memory 150 until the given write entry 142 has completed and has been deallocated.

At block 840, method 800 includes sending, by processing circuit 103, transaction 140 to system memory 150 using communication fabric 130. To send transactions as shown, processing circuit 103 includes a plurality of physical channels 216 to communicate with bridge circuit 120. Bridge circuit 120, in turn, includes a single physical channel 228 to communication fabric 130. To improve a bandwidth for processing transactions, bridge circuit 120 includes support for a plurality of virtual communication channels that use the single physical channel 228. This virtual channel support includes VC selection 223 and VC queues 225a and 225b. After processing circuit 103 sends transaction 140 to bridge circuit 120, VC selection 223 assigns transaction 140 to a selected one of VC queues 225a or 225b.

Method 800, at block 850, additionally includes, in response to the allocation of write entry 142c, removing pending request 141c from pending request buffer 112. After transaction 140 has been sent, and in response to the allocation of write entry 142c, processing circuit 103 may be further configured to invalidate pending request 141c. To invalidate pending request 141c, valid indicator 244c is set to a value that indicates that pending request 141c is not valid and is available for allocation to a different transaction. Completion of transaction 140 is tracked by processing circuit 103 using write entry 142c. In response to receiving response 145 indicating that transaction 140 has been performed, processing circuit 103 may deallocate write entry 142c from write table 114. Method 800 may end after block 850 or, in response to having another transaction to process, may return to block 810.

It is noted that method 800 of FIG. 8 is merely an example. The operations of method 800 are shown as occurring in a particular serial order. These operations may, however, be performed in a different order in other embodiments, and some operations may occur concurrently. For example, the operations described in blocks 820, 830, and 840 may occur in a different order, including some or all portions of the operation occurring concurrently.

Figure 9:
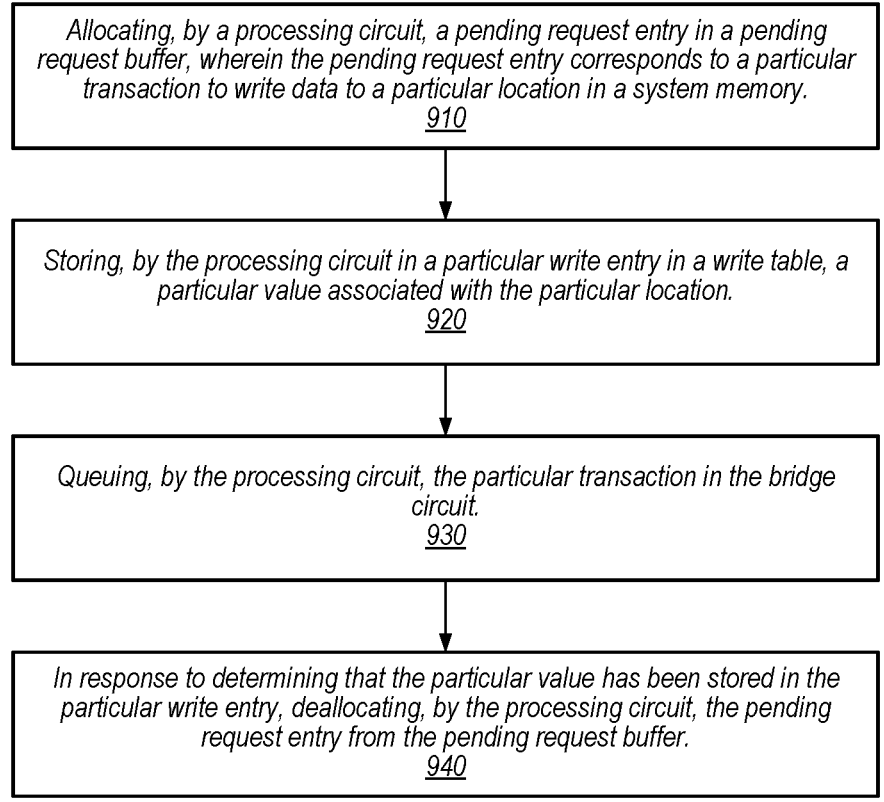
FIG. 9 depicts a flow diagram of a third embodiment of a method for operating a write table by a processing circuit.

Moving to FIG. 9, one more example of a flow diagram illustrating an embodiment of a method for operating a write table is depicted. In a similar manner as the previously disclosed methods 700 and 800, method 900 may be applied to a computer system, such as integrated circuit 101 in FIGS. 1 and 2. Integrated circuit 101 may include, or have access to, computer-readable non-transitory memory that includes instructions that, when executed by processing circuit 103, cause the operations of method 900 to be performed. Referring collectively to FIGS. 1 and 2, and to the flow diagram of FIG. 9, the method may begin in block 910.

Method 900 includes, at block 910, allocating, by processing circuit 103, pending request 141c in pending request buffer 112, wherein pending request 141c corresponds to transaction 140 to write data 243c to location 242c in system memory 150. As shown, the allocating of pending request 141c includes storing several pieces of information, including a request type 241c, a location 242c, data 243c, and a valid indicator 244c. In some embodiments, different pieces of information may be stored in an allocated pending request entry.

At block 920, method 900 further includes storing, by processing circuit 103 in write entry 142c in write table 114, hash value 246c associated with location 242c. To store hash value 246c in write entry 142c, processing circuit 103 may be further configured to generate hash value 246c using a hash of location 242c. Any suitable hashing algorithm may be used. In some embodiments, a portion of a value of location 242c may be used to generate hash value 246c. For example, the least significant bits of an address value that correspond to different locations within a single fetch group may be omitted from the algorithm. After hash value 246c is generated, processing circuit 103 may be further configured to store write entry 142c in write table 114 in response to determining that no other valid entry in write table 114 includes a matching hash value. Otherwise, if a matching hash value is detected, then pending request 141c remains in pending request buffer 112 until the matching write entry is deallocated.

Method 900, at block 930, also includes queuing, by processing circuit 103, transaction 140 in bridge circuit 120. As illustrated, processing circuit 103 may be further configured to send transaction 140 to bridge circuit 120 via one or more of physical channels 216. VC selection 223 may then assign transaction 140 to a selected one of VC queues 225a or 225b to wait for an available transaction slot on physical channel 228. Once a slot becomes available on physical channel 228 and transaction 140 has reached a head of the assigned VC queue, then transaction 140 may be sent via communication fabric 130 to system memory 150.

At block 940, method 900 further includes, in response to determining that hash value 246c has been stored in write entry 142c, deallocating pending request 141c from the pending request buffer 112. After transaction 140 has been sent and write entry 142c has been stored in write table 114, pending request 141c may be deallocated. Since write entry 142c may be used to track completion of transaction 140, and transaction 140 has been sent to bridge circuit 120, pending request 141c may not be needed. Pending request 141c may then be invalidated, for example, by setting valid indicator 244c to a particular value. Since pending request entries in pending request buffer 112 may be larger than write entries in write table 114, freeing pending request 141c for use by other transactions and tracking completion of transaction 140 using the smaller write entry 142c may allow a design of pending request buffer to be smaller, thereby saving die area and potentially reducing power.

After transaction 140 has been performed, system memory 150 and/or communication fabric 130 may send response 145 to processing circuit 103. Processing circuit 103 may deallocate write entry 142c in response to reception of an indication in response 145 that transaction 140, corresponding to write entry 142c, has completed. Processing circuit 103 may then allocate a different write entry to a different transaction in response to the deallocation of write entry 142c. Method 900 may end after completion of block 940 or may return to block 910 in response to having another transaction to process.

Method 900 of FIG. 9 is one example of a technique for managing a write table in a processing circuit. The operations of method 900 are shown as occurring in a particular order. In other embodiments, these operations may be performed in a different order, and in some embodiments, performance of some operations may overlap. The operations of one or more of blocks 910, 920, and 930, for example, may occur in a different order, including concurrently.

Figure 10:
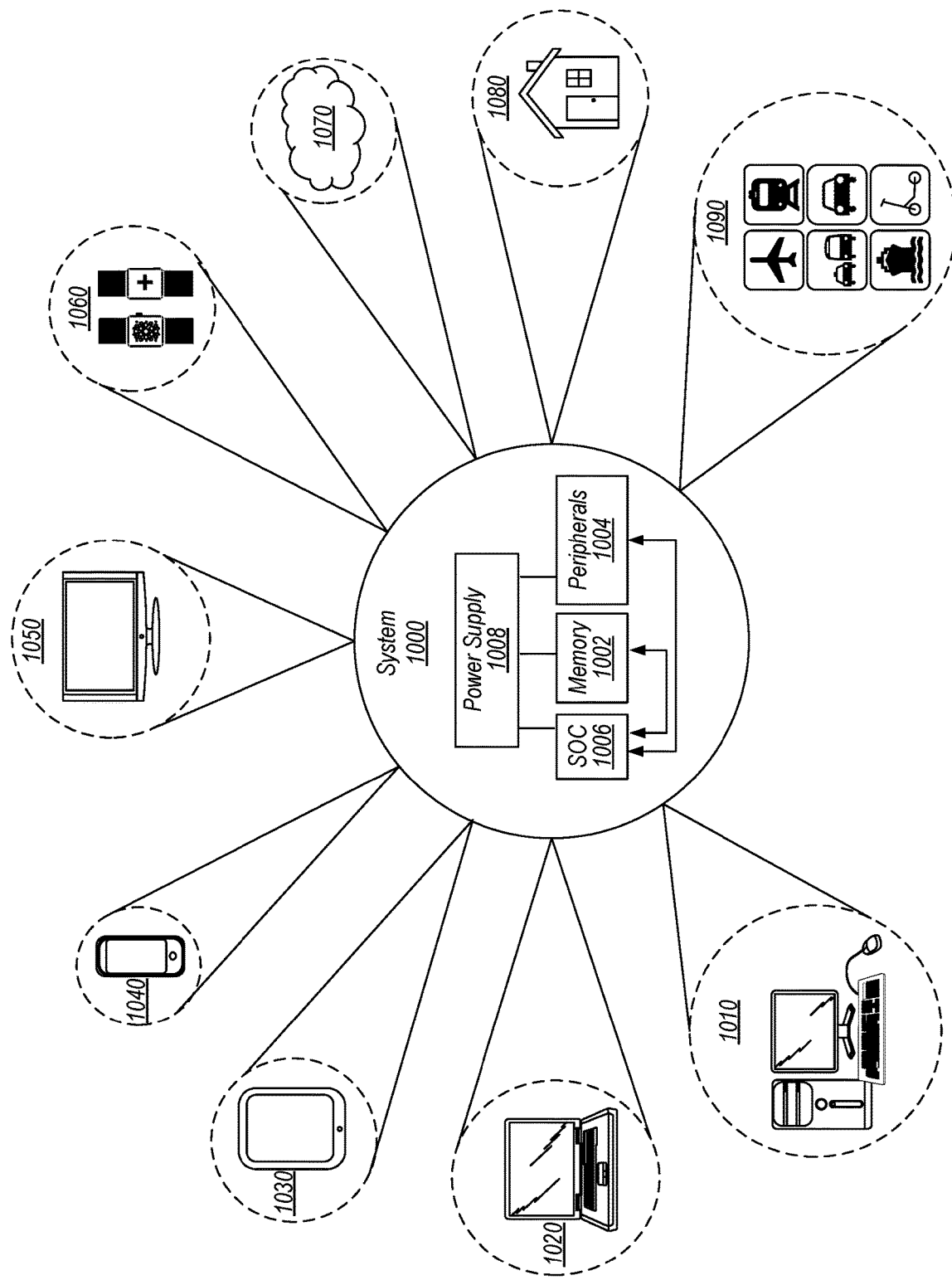
FIG. 10 shows an embodiment of a computing system and various applications for the computing system

Turning next to FIG. 10, a block diagram of one embodiment of a system 1000 is shown that may incorporate and/or otherwise utilize the methods and mechanisms described herein. In the illustrated embodiment, the system 1000 includes at least one instance of a system on chip (SoC) 1006 which may include multiple types of processing circuits, such as a central processing unit (CPU), a graphics processing unit (GPU), or otherwise, a communication fabric, and interfaces to memories and input/output devices. In some embodiments, one or more processors in SoC 1006 includes multiple execution lanes and an instruction issue queue similar to processing circuit 103 (of FIGS. 1 and 2). In various embodiments, SoC 1006 is coupled to external memory 1002, peripherals 1004, and power supply 1008.

A power supply 1008 is also provided which supplies the supply voltages to SoC 1006 as well as one or more supply voltages to the memory 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory 1002 is included as well).

The memory 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration. In some embodiments, memory 1002 may correspond to (or include) system memory 150.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. For example, various devices within the home 1080 (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

As disclosed in regards to FIG. 10, computer system 100 or integrated circuit 101, may be one computer chip within a personal computer, smart phone, tablet computer, or other type of computing device. A process for designing and producing an integrated circuit using design information is presented below in FIG. 11.

Figure 11:
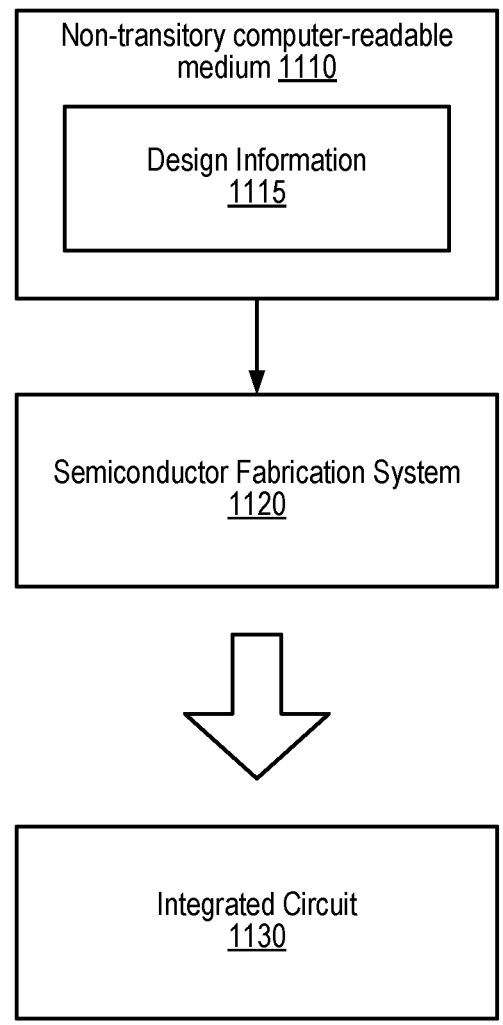
FIG. 11 illustrates a block diagram depicting an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture integrated circuits, such as, for example, integrated circuit 101 and/or system memory 150 of FIG. 1. As depicted, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory circuits or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, Design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
 a communication fabric configured to route transactions between source circuits and a system memory;
 a bridge circuit coupled to the communication fabric:
 a processing circuit coupled to the bridge circuit, and configured to:
  generate a particular transaction to write data to a particular location in the system memory;
  store, into a pending request buffer, a pending request associated with the particular transaction;
  allocate, in a write table, a particular write entry corresponding to the particular transaction, wherein the particular write entry excludes at least a portion of the data to be written;
  send the particular transaction to the bridge circuit to be sent to the system memory; and
  in response to the allocation of the particular write entry and to sending the particular transaction to the bridge circuit, remove the pending request from the pending request buffer.

2. The apparatus of claim 1, wherein the processing circuit is further configured to:
 generate a different transaction to write data to a different location in the system memory;
 store, into the pending request buffer, a different pending request associated with the different transaction;
 in response to a determination that all entries in the write table have been allocated, maintain the different pending request in the pending request buffer; and
 send the different transaction to the system memory using the communication fabric;
 wherein the different transaction is sent with a tag identifying a different pending request entry that is storing the different pending request and the particular transaction is sent with a tag identifying the particular write entry.

3. The apparatus of claim 1, wherein the processing circuit is further configured, in response to receiving a response indicating that the particular transaction has been performed, to deallocate the particular write entry from the write table.

4. The apparatus of claim 1, wherein a size of the particular write entry in the write table is less than a size of the pending request in the pending request buffer.

5. The apparatus of claim 1, wherein the processing circuit includes a plurality of communication channels to the bridge circuit; and
 wherein the bridge circuit includes:
  a single communication channel to the communication fabric; and
  support for a plurality of virtual communication channels that use the single communication channel.

6. The apparatus of claim 1, wherein the processing circuit is further configured, prior to allocating the particular write entry in the write table, to:
 in response to a determination that a given write entry in the write table is allocated to a different transaction to the particular location, maintain the pending request in the pending request buffer; and
 delay sending the particular transaction to the system memory.

7. The apparatus of claim 6, wherein the processing circuit is further configured to:
 deallocate the given write entry in response to receiving an indication that the different transaction has completed; and
 in response to the deallocation of the given write entry, allocate the particular write entry to the particular transaction.

8. A method, comprising:
 allocating, by a processing circuit, a pending request entry in a pending request buffer, wherein the pending request entry is associated with a particular transaction to write data to a particular location in a system memory;
 allocating, by the processing circuit, a particular write entry in a write table wherein the particular write entry is associated with the particular location;
 queuing, by the processing circuit, the particular transaction in a bridge circuit to be sent to the system memory; and
 in response to queuing the particular transaction in the bridge circuit and allocating the particular write entry, deallocating, by the processing circuit, the pending request entry from the pending request buffer.

9. The method of claim 8, wherein allocating the particular write entry includes:
 generating a hash value using the particular location; and
 comparing the hash value to one or more values stored in the write table.

10. The method of claim 9, further comprising:
 in response to determining that an existing write entry includes the hash value, maintaining the pending request entry in the pending request buffer; and
 delaying the queuing of the particular transaction in the bridge circuit.

11. The method of claim 10, further comprising:
 deallocating the existing write entry in response to receiving an indication that a transaction corresponding to the existing write entry has completed; and
 allocating the particular write entry to the particular transaction in response to deallocating the existing write entry.

12. The method of claim 9, further comprising in response to determining that the hash value is not currently stored in the write table, select an available write entry to allocate.

13. The method of claim 8, further comprising:
 allocating a different pending request entry in the pending request buffer, wherein the different pending request entry is associated with a different transaction to write data to a different location;
 in response to determining that the different location corresponds to a particular circuit other than the system memory, maintaining the pending request entry in the pending request buffer; and queuing the different transaction in the bridge circuit to be sent to the particular circuit;

wherein the different transaction is sent with a tag identifying the different pending request entry and the particular transaction is sent with a tag identifying the particular write entry.

14. The method of claim 13, wherein queuing the different transaction includes:

generating a hash value using the particular location;

comparing the hash value to one or more values stored in the write table; and in response to determining that an existing write entry includes the hash value, delaying the queuing of the different transaction until the existing write entry is deallocated.

15. An apparatus, including:

a bridge circuit including a queue to hold received transactions to be performed via a communication fabric;

a processing circuit, including a pending request buffer and a write table, configured to:

allocate a pending request entry in the pending request buffer, wherein the pending request entry corresponds to a particular transaction to write data to a particular location in a system memory;

store, in a particular write entry in the write table, a particular value associated with the particular location;

queue the particular transaction in the bridge circuit; and in response to a determination that the particular transaction has been queued in the bridge circuit and that the particular value has been stored in the particular write entry, deallocate the pending request entry from the pending request buffer.

16. The apparatus of claim 15, wherein to store the particular value in the particular write entry, the processing circuit is further configured to generate the particular value using a hash of the particular location.

17. The apparatus of claim 16, wherein the processing circuit is further configured to:

allocate a different pending request entry in the pending request buffer, wherein the different pending request entry corresponds to a different transaction to write data to a different location in the system memory;

generate a different value using a hash of the different location;

in response to determining that an existing write entry includes the different value, maintain the different pending request entry in the pending request buffer; and delay placement of the particular transaction in the queue of the bridge circuit.

18. The apparatus of claim 17, wherein the processing circuit is further configured to:

deallocate the existing write entry in response to a reception of an indication that a transaction corresponding to existing write entry has completed; and allocating a different write entry to the different transaction in response to the deallocation of the existing write entry.

19. The apparatus of claim 15, wherein the processing circuit is further configured to:

allocate a different pending request entry in the pending request buffer, wherein the different pending request entry corresponds to a different transaction to write data to a different location in the system memory; and in response to a determination that all entries in the write table have been allocated, maintain the different pending request entry in the pending request buffer.

20. The apparatus of claim 19, wherein the processing circuit is further configured, in response to a determination that a number of available pending request entries does not satisfy a threshold value, to:

delay placement of the different transaction in the queue of the bridge circuit; and in response to a determination that a given write entry in the write table has been deallocated:

store, in the given write entry, a different value associated with the different location;

queue the different transaction in the bridge circuit; and in response to a determination that the different value has been stored in the given write entry, deallocate the different pending request entry from the pending request buffer;

wherein the different transaction is queued with a tag identifying the given write entry and the particular transaction is queued with a tag identifying the particular write entry.

* * * * *